(12) United States Patent
Ibanez et al.

(10) Patent No.: US 12,247,764 B2
(45) Date of Patent: Mar. 11, 2025

(54) SOLAR TRACKING SYSTEM FOR COMPLEX TERRAIN

(71) Applicant: Inventus Holdings, LLC, Juno Beach, FL (US)

(72) Inventors: Mario D. Ibanez, Jupiter, FL (US); Kristen T. Bradford, Rosemount, MN (US); Sriharsha Veeramachaneni, Minneapolis, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 420 days.

(21) Appl. No.: 17/851,757

(22) Filed: Jun. 28, 2022

(65) Prior Publication Data

US 2023/0417456 A1 Dec. 28, 2023

(51) Int. Cl.
*F24S 50/20* (2018.01)
*G05B 15/02* (2006.01)

(52) U.S. Cl.
CPC .............. *F24S 50/20* (2018.05); *G05B 15/02* (2013.01)

(58) Field of Classification Search
CPC ........... F24S 50/20; H02S 20/32; H02S 10/00
See application file for complete search history.

(56) References Cited

U.S. PATENT DOCUMENTS

2016/0099673 A1 4/2016 Wolter
2022/0026110 A1 1/2022 Ma

FOREIGN PATENT DOCUMENTS

| CN | 101567647 A | 3/2009 | |
|---|---|---|---|
| CN | 106933255 A | 7/2017 | |
| CN | 110658858 A | 1/2020 | |
| CN | 210041737 U | 2/2020 | |
| CN | 112389593 A * | 2/2021 | ............. H02S 20/30 |
| CN | 213094112 U | 4/2021 | |
| CN | 110136027 B | 6/2021 | |
| CN | 213717907 U | 7/2021 | |
| WO | WO-2019229041 A1 * | 12/2019 | ............. H02S 20/32 |

* cited by examiner

*Primary Examiner* — Georgia Y Epps
*Assistant Examiner* — Don J Williams
(74) *Attorney, Agent, or Firm* — Tarolli, Sundheim, Covell & Tummino LLP

(57) ABSTRACT

A solar tracking system includes a database to store data associated with a solar field comprising physical location parameters of each of a set of solar panels. The physical location parameters can include a relative row-to-row height and spacing of the solar panels. The system also includes a parameter aggregation tool to aggregate the physical location parameters to generate aggregate time-based output power data associated with the solar field based on geolocation data associated with the solar field. The system also includes a solar tracking tool to generate a solar tracking control scheme for the solar field based on the aggregate time-based output power data, the geolocation data associated with the solar field, and a row-to-row backtracking constraint. The set of solar panels of the solar field can implement solar tracking based on the solar tracking scheme.

20 Claims, 6 Drawing Sheets

700

| GCR | BLOCK 1 | | BLOCK 2 | | BLOCK 3 | | BLOCK 4 | |
|---|---|---|---|---|---|---|---|---|
| | MORNING | EVENING | MORNING | EVENING | MORNING | EVENING | MORNING | EVENING |
| 30.0 | 32318 | 31372 | 32076 | 31203 | 32211 | 31109 | 32274 | 31074 |
| 30.5 | 32297 | 31353 | 32059 | 31186 | 32204 | 31092 | 32283 | 31057 |
| 31.0 | 32277 | 31334 | 32042 | 31170 | 32201 | 31074 | 32304 | 31040 |
| 31.5 | 32257 | 31313 | 32027 | 31153 | 32210 | 31056 | 32349 | 31023 |
| 32.0 | 32239 | 31294 | 32014 | 31137 | 32241 | 31039 | 32422 | 31006 |
| 32.5 | 32223 | 31273 | 32007 | 31123 | 32313 | 31020 | 32472 | 30989 |
| 33.0 | 32216 | 31254 | 32010 | 31116 | 32472 | 31002 | 32535 | 30973 |
| 33.5 | 32231 | 31239 | 32004 | 31126 | 32658 | 30984 | 32638 | 30961 |
| 34.0 | 32233 | 31244 | 32028 | 31200 | 32730 | 30969 | 32844 | 30961 |
| 34.5 | 32655 | 31380 | 32187 | 31363 | 32801 | 30977 | 32906 | 30955 |
| 35.0 | 32764 | 31373 | 32326 | 31481 | 32870 | 31040 | 32912 | 30942 |
| 35.5 | 32894 | 31445 | 32526 | 31725 | 32914 | 31079 | 32909 | 30961 |
| 36.0 | 32912 | 31685 | 32564 | 31837 | 32917 | 31120 | 32874 | 31079 |
| 36.5 | 32885 | 31785 | 32765 | 31863 | 32887 | 31262 | 32856 | 31219 |
| 37.0 | 32850 | 31853 | 32799 | 31664 | 32851 | 31457 | 32837 | 31315 |
| 37.5 | 32812 | 31858 | 32787 | 31858 | 32813 | 31596 | 32805 | 31401 |
| 38.0 | 32774 | 31839 | 32760 | 31837 | 32774 | 37675 | 32770 | 31494 |

SOLAR TRACKING SYSTEM FOR COMPLEX TERRAIN

TECHNICAL FIELD

This disclosure relates generally to solar panels, and more specifically to a solar tracking system for complex terrain.

BACKGROUND

Renewable and natural energy sources are becoming more popular for generating power. Such renewable and natural energy sources are persistently available, require no fuel, generate no pollutants, and are more widely accepted in a more ecologically conscientious society. Such renewable and natural energy sources can be scaled to a great extent to provide renewable power plants. One such renewable power plant is a solar field (i.e., solar farm) that harnesses a large amount of solar energy to generate electricity for a public power grid to provide clean and renewable energy to a community. A solar field can be implemented as a large-scale photovoltaic system that includes a large number of photovoltaic modules (i.e., solar panels) arranged in series to convert light directly to electricity. By utilizing a very large number of solar panels, a solar field can supply power at a utility level, rather than to a local user or users based on building-mounted and other decentralized solar power applications. Furthermore, a solar field can implement solar tracking, such that the solar panels are rotated as the Sun moves across the sky to optimize capture of the solar energy.

SUMMARY

A solar tracking system includes a database to store data associated with a solar field comprising physical location parameters of each of a set of solar panels. The physical location parameters can include a relative row-to-row height and spacing of the solar panels. The system also includes a parameter aggregation tool to aggregate the physical location parameters to generate aggregate time-based output power data associated with the solar field based on geolocation data associated with the solar field. The system also includes a solar tracking tool to generate a solar tracking control scheme for the solar field based on the aggregate time-based output power data, the geolocation data associated with the solar field, and a row-to-row backtracking constraint. The set of solar panels of the solar field can implement solar tracking based on the solar tracking scheme.

Another example includes a method for implementing a solar tracking algorithm. The method includes obtaining physical location parameters associated with each of a set of solar panels of a solar field. The physical location parameters include a relative row-to-row height and spacing of the solar panels and storing the physical location parameters in a solar panel database. The method also includes generating aggregate time-based output power data associated with the solar field via a parameter aggregation tool based on geolocation data associated with the solar field. The method also includes generating a solar tracking control scheme for the solar field via a solar tracking tool based on the aggregate time-based output power data, the geolocation data associated with the solar field, and a row-to-row backtracking constraint. The method further includes implementing solar tracking of the set of solar panels of the solar field via a panel tracking controller based on the solar tracking control scheme.

Another example includes a solar tracking system. The system includes a database to store data associated with a solar field comprising physical location parameters of each of a set of solar panels. The physical location parameters can include a relative row-to-row height and spacing of the solar panels. The system also includes a parameter aggregation tool to aggregate the physical location parameters to generate aggregate time-based output power data associated with the solar field based on geolocation data associated with the solar field. The system also includes a solar tracking tool that includes an ideal solar tracking control scheme for a default set of physical location parameters corresponding to equal row-to-row height and spacing of the solar panels. The solar tracking tool can be configured to adjust the ideal solar tracking control scheme based on the aggregate time-based output power data, the geolocation data associated with the solar field, and a row-to-row backtracking constraint to generate an adjusted solar tracking control scheme. The set of solar panels of the solar field can implement solar tracking based on the solar tracking scheme.

DETAILED DESCRIPTION

Figure 1:
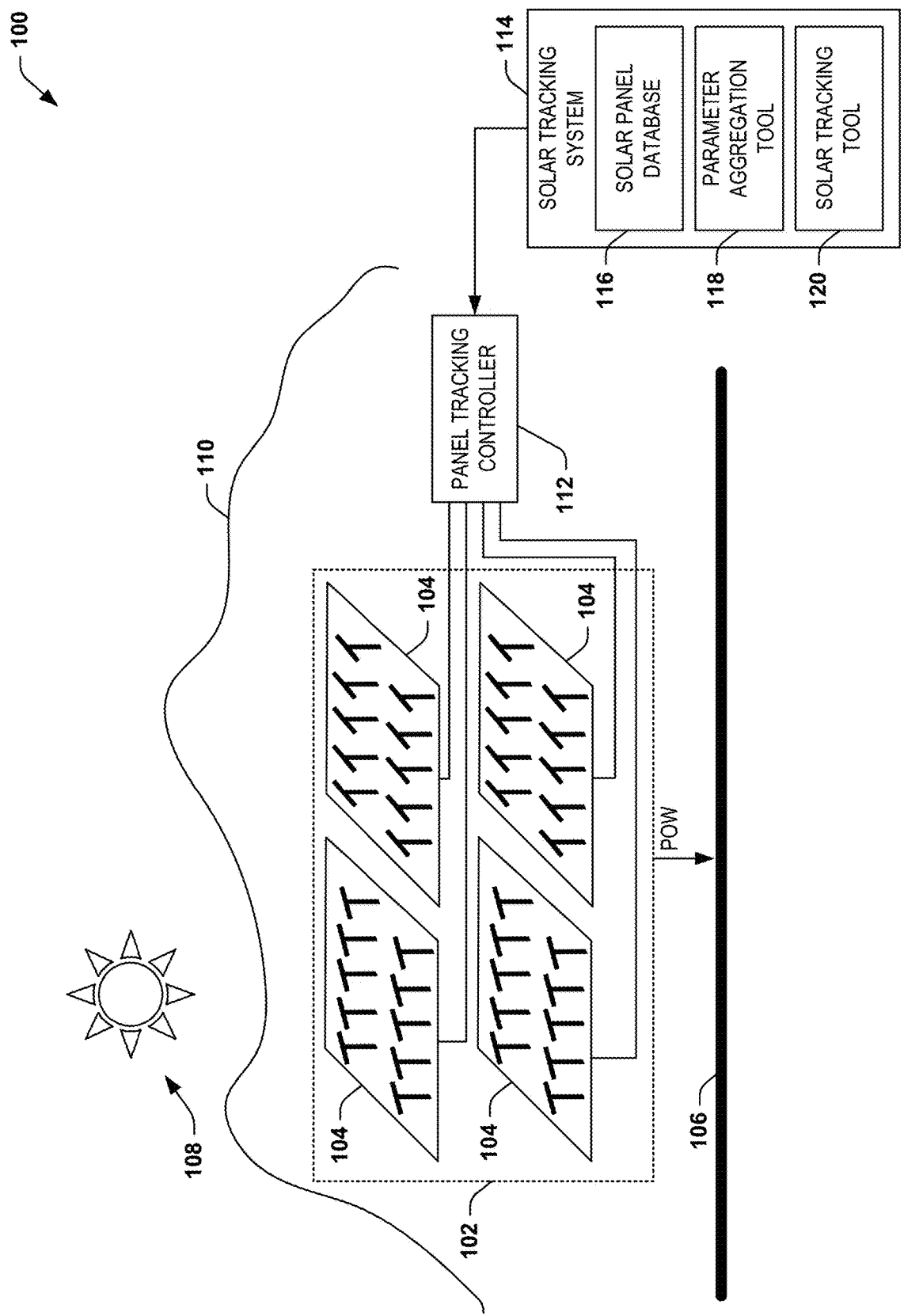
FIG. 1 illustrates an example of a utility power system.

This disclosure relates generally to solar panels, and more specifically to a solar tracking system for complex terrain. The solar tracking system implements physical location parameters associated with solar panels in a solar panel field to adjust the time-based solar tracking algorithm to accommodate the physical parameters to optimize solar energy capture. The physical location parameters of the solar panels can be based on variation in row-to-row physical separation of the solar panels of a solar field, variation in mounting height of the poles that mount each of the solar panels to the ground, and variation of the topography of the ground (e.g., variations of elevation) on which the solar field is installed. As an example, the physical location parameters can be ascertained based on construction data of the solar field, digital terrain and elevation data (DTED) associated with the geographic area of the solar field, and/or overhead imaging of the solar field (e.g., from a drone or other aircraft). For example, complex terrain such as changes in slope of the elevation (e.g., a side of a hill) can greatly affect the solar tracking over the course of the day based on how much shadow may be cast upon solar panels in a next row based on the tilt of a given row of solar panels. Such shadowing on the surface of a solar panels can be greatly detrimental to the amount of received solar energy, so the time-based solar tracking algorithm can be adjusted to optimize the tracking tilt of the solar panels over the course of the day to maximize solar energy capture while mitigating shadows on neighboring solar panels.

As described herein, a given row of solar panels of the solar field can rotate to track the position of the Sun in the sky. The rotation of the solar panels in the row is therefore a rotation about an axis that extends along the row. The rotation of a given solar panel in a given row may cast a shadow on a solar panel in a next row (e.g., approximately parallel to the given row). Therefore, as described herein, the term "row-to-row" refers to characteristics of the solar panel or panels in one row relative to a next neighboring row.

The solar tracking system includes a solar panel database that is configured to store the physical location parameters, as well as a variety of other data regarding the solar panels of the solar field. The solar tracking system also includes a parameter aggregation tool to aggregate the physical location parameters to generate aggregate time-based output power data associated with the solar field based on geolocation data associated with the solar field and based on a row-to-row backtracking constraint. As described herein, the geolocation data of the solar field dictates astronomical data associated with time-based azimuth position of the Sun at a given latitude and longitude as a function of time over the course of a given year. As also described herein, the term "backtracking" refers to adjusting extreme angular tilt of the solar panels when solar tracking (e.g., during early morning and/or late evening) to mitigate long shadows cast on neighboring solar panels that can result in photovoltaic shading losses. Therefore, as further described herein, the term "row-to-row backtracking constraint" refers to a predefined constraint regarding the casting of shadows from a solar panel in one row to the neighboring solar panel in a next neighboring row. As an example, the row-to-row backtracking constraint can define an acceptable amount of shadow being cast on the neighboring solar panel (e.g., as a percentage of surface area), which can be zero.

As an example, the aggregate time-based output power data can model the power output of a block of solar panels (e.g., including multiple rows) over the course of an entire day as a function of day of the year based on the geolocation data and based on ideal azimuth tracking of the Sun. Based on the row-to-row backtracking constraint, the aggregate time-based output power data can thus include limits to the azimuth solar tracking based on the row-to-row shadowing of the solar panels resulting from varying height and/or distance of the adjacent rows of solar panels, as defined by the physical location parameters. Therefore, the aggregate time-based output power data can define limits to the solar tracking of the solar panels based on the row-to-row backtracking constraints. As an example, the aggregate time-based output power data can be converted to adjusted power output for each of different solar tracking parameters, such as ground coverage ratio (GCR) parameters, across a full ideal solar azimuth tracking of the solar panels, with each of the different solar tracking parameters being representative of a different solar tracking scheme between a first rotation angle limit (e.g., associated with morning) and a second rotation angle limit (e.g., associated with evening) corresponding to a respective physical layout (e.g., GCR layout) of the solar field.

The solar tracking system also includes a solar tracking tool that is configured to generate a solar tracking control scheme for the solar field. As an example, the solar tracking tool can implement (e.g., store in memory) an ideal solar tracking control scheme that is based on an ideal solar field having a default set of physical location parameters that correspond to equal spacing between panel rows and a flat topography (thereby having an equal row-to-row height of the solar panels). The ideal solar tracking control scheme can provide for solar tracking control based on each of different solar tracking parameters at different times of day and year based on the geolocation data of the solar field. The solar tracking tool can be configured to modify the ideal solar tracking control scheme based on the aggregate time-based output power data to generate an adjusted solar tracking control scheme. For example, the adjusted power output for each of different solar tracking parameters across a full ideal solar azimuth tracking of the solar panels, as represented by the aggregate time-based output power data, can be applied to the power output of the different solar tracking parameters of the ideal solar tracking control scheme. Thus, the different solar tracking parameters of the adjusted solar tracking control scheme can be representative of a true power output of the solar field for each different solar tracking scheme.

The solar tracking system further includes a solar tracking controller that is configured to implement the solar tracking of the solar panels (e.g., operating the tilt motors) based on the adjusted solar tracking control scheme. For example, the solar tracking controller can be configured to select one of the solar tracking parameters of the adjusted solar tracking control scheme having a highest output power to operate the solar tracking of the solar panels. As an example, the adjusted solar tracking control scheme can include multiple power outputs for different times of the day (e.g., morning, evening, hourly increments, etc.) for each solar tracking parameter. Therefore, the solar tracking tool can select one of the solar tracking parameters of the adjusted solar tracking control scheme having a highest output power at each of the different times of the day to operate the solar tracking of the solar panels.

Accordingly, the solar tracking system accounts for shadowing of neighboring panels at extreme times of day of sun exposure (e.g., early morning and/or late evening) for solar fields that are built on complex terrain (e.g., hillsides). As a result, solar energy capture by the solar field on complex terrain can be maximized while shadows on neighboring panels can be mitigated to provide for maximum power output of the solar field.

A solar power system can be implemented in any of a variety of utility power systems, such as demonstrated in the example of FIG. 1. FIG. 1 illustrates an example of a solar power system 100. The solar power system 100 includes a solar field 102 that includes blocks of solar panels 104 collectively configured to provide power, demonstrated in the example of FIG. 1 as POW, to a power transmission system 106. The power transmission system 106 can correspond to a power bus or one or more points-of-interconnect (POIs) that provide power to consumers. In the example of FIG. 1, the blocks of solar panels 104 are configured to generate the power POW via the Sun, demonstrated at 108. In the example of FIG. 1, the blocks of solar panels 104 are built upon complex terrain 110, demonstrated as the side of a hill/mountain, that provides uneven height of the solar panels 104 from one row of solar panels to a next.

In the example of FIG. 1, the solar power system includes a panel tracking controller 112 that is configured to implement a solar tracking control scheme for the solar panels 104. The solar tracking control scheme can provide for rotation of the solar panels 104 to face the Sun 108 as it moves across the sky to provide for optimal solar energy capture. As an example, the panel tracking controller 114 can be located at the solar field 102. However, because the solar panels 104 are installed on the complex terrain 110, shadows can be cast from a solar panel in one row to a corresponding solar panel in a next row at more extreme angles of the rotation of the solar panels 104. Therefore, as described in greater detail herein, the solar power system 100 can include a solar tracking system 114 configured to generate a solar tracking control scheme that mitigates shadows on neighboring solar panels, and thereby optimizes solar energy capture over the course of a full day based on the azimuth positioning of the Sun 108.

The solar tracking system 114 includes a solar panel database 116, a parameter aggregation tool 118, and a solar tracking tool 120. As an example, physical location characteristics associated with the solar panels 104 can be obtained and stored in the solar panel database. For example, overhead images of the solar panels 104 can be obtained (e.g., via an unmanned aerial vehicle (UAV)) to determine row-to-row spacing and relative height of the solar panels 104. Alternatively or additionally, the physical location parameters can be obtained from construction data of the solar field and/or digital terrain and elevation data (DTED) associated with the geographic area of the solar field.

As described in greater detail herein, the parameter aggregation tool 118 can aggregate the physical location parameters of the solar panels 104 and the solar tracking tool 120 can generate a solar tracking control scheme for implementing solar tracking of the solar panels 104 in a manner that mitigates shadows cast on neighboring solar panels. Accordingly, solar energy capture by the solar field on complex terrain can be maximized while shadows on neighboring panels can be mitigated to provide for maximum power output of the solar field. As demonstrated in the example of FIG. 1, and as described in greater detail herein, the solar tracking control scheme can be implemented differently for each of the sets of solar panels 104, such as based on variations of the complex terrain between the different sets of solar panels.

Figure 2:
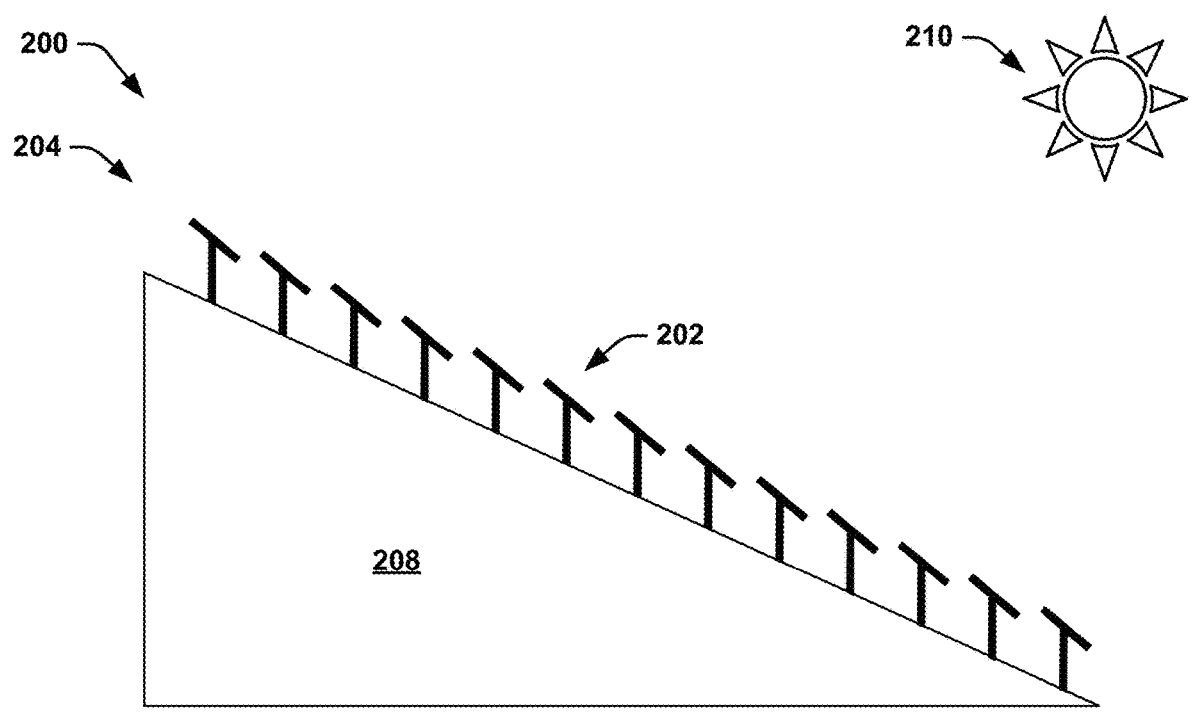
FIG. 2 illustrates an example diagram of solar tracking.
Figure 2:
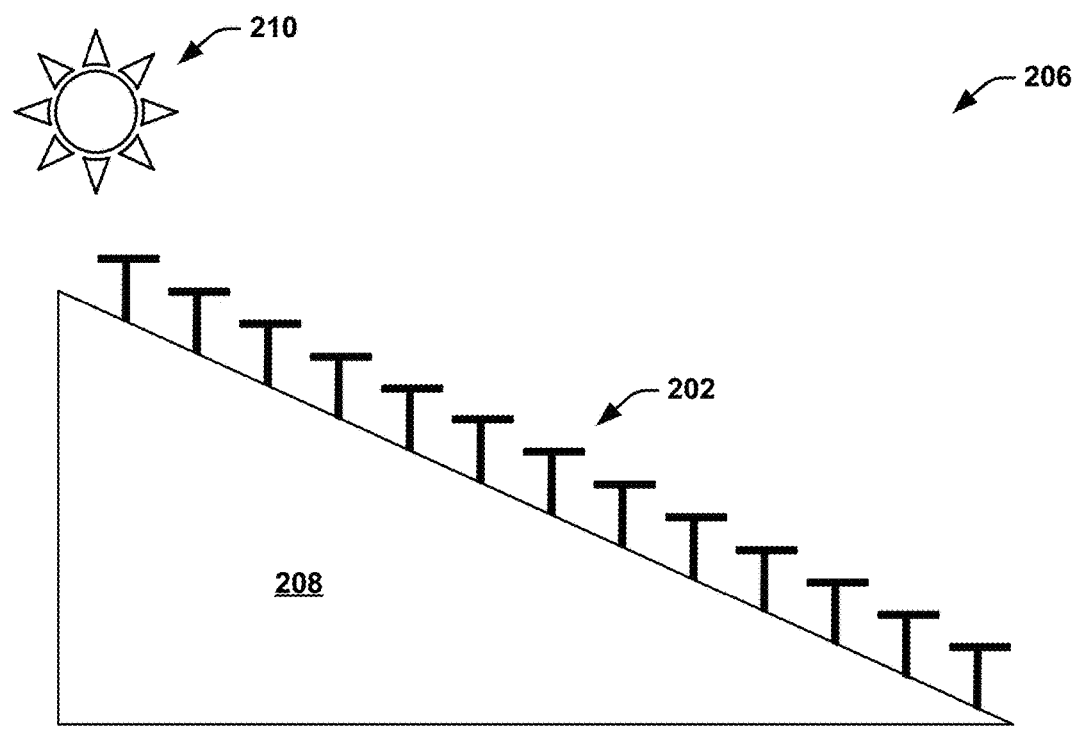

FIG. 2 illustrates an example diagram 200 of solar tracking. The diagram 200 includes a solar field 202 that is demonstrated in a first view 204 associated with a first time of the day (e.g., morning) and a second view 206 associated with a second time of day (e.g., evening). The diagram 200 can correspond to solar tracking of the solar panels 104 by the solar tracking system 114. Therefore, reference is to be made to the example of FIG. 1 in the following description of the example of FIG. 2.

The solar field 202 is demonstrated simplistically as being built on a side of a hill, demonstrated generally at 208, that slopes down eastward. In the example of FIG. 2, the solar field 202 is demonstrated two-dimensionally as single solar panels that are each part of a row of solar panels extending into and/or out of the page of FIG. 2. In the first view 204, the Sun, demonstrated at 210, is located in an eastern part of the sky (e.g., during morning). The solar panels of the solar field 202 are directed at an angle that allows for rays of the Sun 210 to be incident on the solar panels at approximately normal angles, thereby optimizing the capture of solar energy from the Sun 210. As the Sun 210 moves across the sky, the solar tracking scheme of the solar field 202 can provide for the solar panels to follow the position of the Sun 210, thus attempting to maintain the approximate normal angle of incidence of the rays of the Sun 210 on the solar panels.

Because the solar field 202 is built on a hillside, a given solar panel of a given row has a different elevation relative to the solar panels in each of the neighboring rows to the east and west. Based on the difference in row-to-row height of the solar panels of the solar field 202 and based on the row-to-row spacing of the solar panels of the solar field 202, the angle of tilt of the solar panels during the course of the day can result in a shadow being cast upon the surface of a corresponding solar panel in a next row. In the example of FIG. 2, when the tilt of the solar panels is more similar to the slope of the hill 208, the angle of the tilt can be more extreme without casting shadows from one solar panel to a neighboring corresponding solar panel (e.g., the next most westward solar panel in the example of FIG. 2). However, as the solar panels tilt in an angle opposite the slope of the hill 208 in attempting to track the azimuth and zenith or location of the Sun 210, the solar tracking can result in shadows being cast from one solar panel to a next to a neighboring corresponding solar panel (e.g., the next most eastward solar panel in the example of FIG. 2).

In the second view 206 the Sun 210 is located in a western part of the sky (e.g., during evening). To mitigate shadows being cast from one solar panel to a next most eastward neighboring solar panel, the solar tracking system 114 can limit the tilt the of the solar panels. In the example of FIG. 2, the solar panels of the solar field 202 are demonstrated as limited to no longer facing directly at the Sun 210. Therefore, while the angle of incidence of the rays of the Sun 210 is no longer approximately normal to the surface of the solar panels, the limit of the tilt can be such that the solar panels do not cast shadows on neighboring solar panels. Accordingly, the solar tracking system 114 can be configured to control the solar tracking of the solar panels of the solar field 202 in a way that optimizes the capture of solar energy while mitigating shadows. The manner in which the solar tracking system 114 implements such a solar tracking control scheme is described hereinafter.

The example of FIG. 2 is demonstrated in a very simplistic diagram, and is not intended to demonstrate scale or dimension with respect to the solar field 202. While the hill 208 is demonstrated as having a constant slope, the complex terrain and arrangement of solar panels in a solar field can be significantly more variable. The solar tracking system 114 can operate under any such variation in arrangement of complex terrain and/or arrangement of solar panels in a given solar field. In addition, as described in greater detail herein, the solar field 202 can include multiple separate blocks of solar panels that are each controlled differently by the solar tracking system 300.

Figure 3:
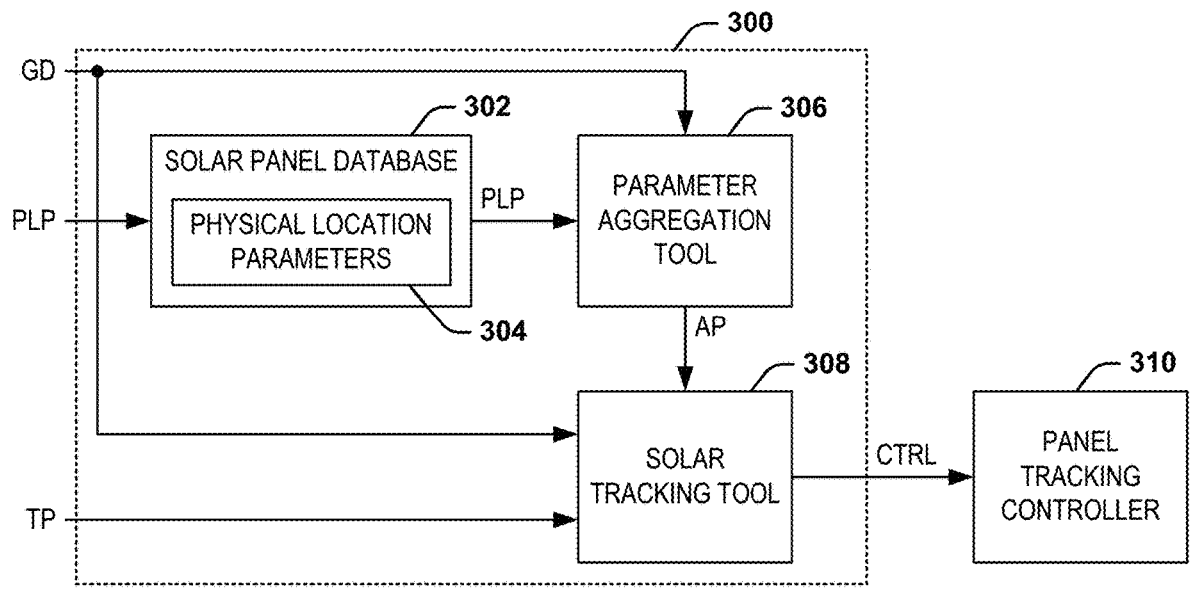
FIG. 3 illustrates an example block diagram of a solar tracking system.

FIG. 3 illustrates an example block diagram of a solar tracking system 300. The solar tracking system 300 can be implemented to optimize capture of solar energy while mitigating shadows, such as for the solar field 202 that is constructed on complex terrain, as described above. As an example, the solar tracking system 300 can correspond to software, hardware, firmware, or a combination thereof. As an example, the solar tracking system 300 can be implemented on a user terminal or graphical user interface (GUI) at an office or on a portable computing device. The solar tracking system 300 can correspond to the solar tracking system 114 in the example of FIG. 1. Therefore, reference is to be made to the example of FIGS. 1 and 2 in the following example of FIG. 3.

The solar tracking system 300 includes a solar panel database 302 that is configured to store data associated with the solar field 202. The data associated with the solar field 202 can include all manner of data necessary to operate the solar field 202 to harvest solar power. In addition, the solar panel database 302 is configured to store physical location parameters 304. The physical location parameters 304 include a relative row-to-row height and spacing of each of the solar panels of the solar field 202, such that it can be determined whether a given tilt orientation of a solar panel relative to a position of the Sun can result in a shadow being cast on a neighboring solar panel. The physical location parameters 304 can be provided from an external source, represented as a signal PLP that is provided to the solar panel database 302. As an example, the physical location parameters 304 can be obtained based on overhead imaging, such as from a UAV, and/or can be obtained from measurements during construction of the solar field 202 and/or from digital terrain and elevation data (DTED).

Figure 4:
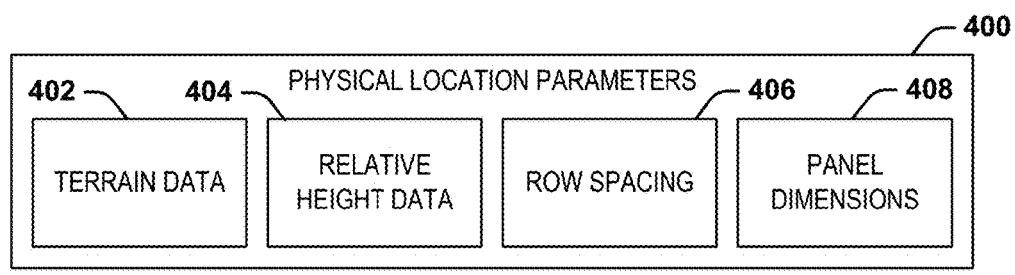
FIG. 4 illustrates an example block diagram of physical location parameters of solar panels.

FIG. 4 illustrates an example block diagram of physical location parameters 400 of solar panels. The physical location parameters 400 can correspond to the physical location parameters 304 in the example of FIG. 3. Therefore, reference is to be made to the example of FIG. 3 in the following description of the example of FIG. 4.

The physical location parameters 400 include terrain data 402, relative height data 404, row spacing 406, and panel dimensions 408. The terrain data 402 can correspond to topographical information regarding the geographic region on which the solar field 202 is constructed. Therefore, the terrain data 402 can include information regarding terrain elevation across the solar field 202. As an example, the terrain data 402 can be provided from DTED or topographical maps associated with the geographic area. The terrain data 402 can also include geolocation data of the solar field 202, such as to ascertain the Sun's position at any given time of day over the course of a year based on astronomical data.

The relative height data 404 can include a relative mounting height of the solar panels, such as based on variation in length of associated mounting poles and/or depth of insertion of the mounting poles in the ground. The relative height data 404 can thus define row-to-row variations in three-dimensional height of the solar panels relative to each other. As an example, the relative height data 404 can be related to/associated with the terrain data 402 to fully define the row-to-row variations in height of the solar panels in three-dimensional space.

The row spacing 406 includes a distance between each solar panel and a corresponding neighboring solar panel in the next row. The panel dimensions 408 can define the dimensions of the solar panels (e.g., including a two-dimensional set of dimensions of the surface of the solar panels). Therefore, the terrain data 402, the relative height data 404, the row spacing 406, and the panel dimensions 408 can be implemented to determine at what tilt of the solar panels causes the casting of shadows as a function of azimuth locations of the Sun based on trigonometry. The terrain data 402, the relative height data 404, the row spacing 406, and the panel dimensions 408 can also be implemented to determine output power of each of the solar panels, as described in greater detail herein.

Referring back to the example of FIG. 3, the solar tracking system 300 also includes a parameter aggregation tool 306. The parameter aggregation tool 306 is configured to access the physical location parameters 304 from the solar panel database 302, demonstrated as the signal PLP, and geolocation data associated with the geographic area, demonstrated as a signal GD, to generate aggregate time-based output power data, demonstrated as a signal AP. The aggregate time-based output power data AP can correspond to a power output of the solar field 202 based on the geolocation data, and therefore the azimuth position of the Sun at each time of each day of the year, based on the physical location parameters 304 and based on the solar tracking of the solar panels of the solar field 202. As an example, the aggregate time-based output power data AP can include a total power output over the course of a day (e.g., each day of the year) that includes the deleterious contribution from shadows, as described in greater detail herein.

Figure 5:
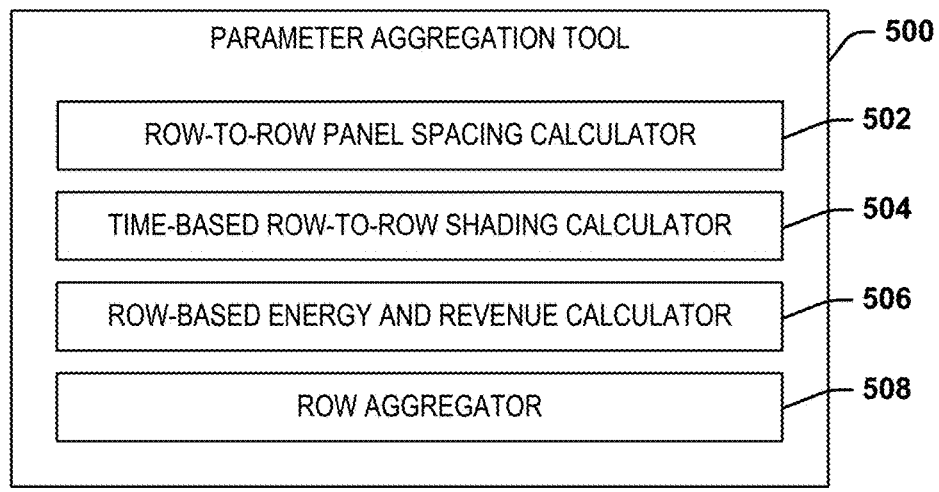
FIG. 5 illustrates an example block diagram of a parameter aggregation tool.

FIG. 5 illustrates an example block diagram of a parameter aggregation tool 500. The parameter aggregation tool 500 is demonstrated in the example of FIG. 5 as including a set of algorithm steps. Thus, the parameter aggregation tool 500 can be implemented in software, hardware, firmware, or a combination thereof. The parameter aggregation tool 500 can correspond to the parameter aggregation tool 306 in the example of FIG. 3. Therefore, reference is to be made to the example of FIG. 3 in the following description of the example of FIG. 5.

The parameter aggregation tool 500 includes a row-to-row spacing calculator 502 that is configured to calculate the row-to-row spacing for each solar panel and a corresponding solar panel in a next row of the solar field 202. The row-to-row spacing can be expressed as a distance between the solar panels, such as from edges of the solar panels or between mounting poles. The row-to-row spacing calculator 502 can also implement a combination of the terrain data 402 and the relative height data 404 to calculate a relative spacing and height of each of the solar panels in three-dimensional space.

The parameter aggregation tool 500 also includes a time-based row-to-row shading calculator 504. The time-based row-to-row shading calculator 504 is configured to implement the relative spacing and height of each of the solar panels in three-dimensional space, as calculated by the row-to-row spacing calculator 502, to determine at which tilt angle and position of the Sun each of the solar panels will experience shading. The time-based row-to-row shading calculator 504 can implement the geolocation data of the solar field 202, and by extension, the astronomical data associated with the position of the Sun as a function of time of day and day of the year. Therefore, the time-based row-to-row shading calculator 504 can iteratively model the position of the Sun and the corresponding relative tilt position of a given solar panel from a first extreme tilt to a second opposite extreme tilt to determine the angles of tilt that a shadow is cast upon a corresponding neighboring solar panel in a next row, as well as how much of a shadow (e.g., based on a percentage of area of the solar panel) based on trigonometry. The time-based row-to-row shading calculator 504 can implement the algorithm iteratively for each of the solar panels in the solar field 202 to determine the shading of neighboring solar panels over time for each day of the year.

The parameter aggregation tool 500 also includes a row-based energy and revenue calculator 506. The row-based energy and revenue calculator 506 is configured to implement the shading calculation provided by the time-based row-to-row shading calculator 504 to determine a total power output of each solar panel in a given row, and by extension of an entire row, in each given day of the year. The row-based energy and revenue calculator 506 can provide such a power output calculation for an entirety of tilt of the each of the solar panels from a first extreme tilt to a second opposite extreme tilt. Based on the determined shading, the row-based energy and revenue calculator 506 can thus determine a total output power over the entirety of tilt of each given solar panel on each day of the year. The row-based energy and revenue calculator 506 can thus sum the total output power of each solar panel in each given row of the solar field 202. Furthermore, the row-based energy and revenue calculator 506 can convert the total output power to revenue based on any of a variety of conversions (e.g., current energy price relative to maintenance costs, etc.).

The parameter aggregation tool 500 also includes a row aggregator 508. The row aggregator 508 is configured to implement the calculated total output power of each of the rows of the solar field 202 to an aggregation of the entire solar field 202. Thus, the row aggregator 508 can be configured to determine a total output power over the entirety of tilt of the solar field 202 on each day of the year. The total output power can be modeled in a time-basis over the course of a day, such that the row aggregator 508 can be configured to identify the time of day and/or corresponding tilt angles of the solar panels at which shadows deleteriously affect the output power. The row aggregator 508 can further aggregate the revenue based on the revenue information provided by the row-based energy and revenue calculator 506.

As an example, row aggregator 508 can be configured to implement the total output power modeled in the time-basis over the course of each day to determine the times of day that correspond to tilt of the solar panels. As described in greater detail herein, the times of the output power that are affected by shadows and not affected by shadows can be determinative of satisfaction of a predetermined row-to-row backtracking constraint. For example, the row aggregator 508 can provide a single power output for each given row over the entire day, or over entire portions of the day, with such power output information including losses from shadows. Thus, the row aggregator 508 can generate the aggregate time-based output power data AP as pertaining to the output power at each time of the day (e.g., each day of the year).

Referring back to the example of FIG. 3, the solar tracking system 300 also includes a solar tracking tool 308. The solar tracking tool 308 is configured to receive the aggregate time-based output power data AP and to generate a solar tracking control scheme based on the aggregate time-based output power data AP, based on the geolocation data GD, and based on a predetermined row-to-row backtracking constraint. For example, the row-to-row backtracking constraint can correspond to an acceptable amount of shadowing on a given solar panel, which can be expressed as a function of percentage of coverage, and which can be zero.

As an example, the solar tracking tool 308 can maintain (e.g., by accessing from the solar panel database 302) an ideal solar tracking control scheme that is based on having a set of default parameters of a hypothetical solar farm. The default parameters can correspond to ideal physical location parameters, such as approximately equal row-to-row height of the solar panels and approximately equal row-to-row spacing of the solar panels. As an example, the ideal solar tracking control scheme can be any of a variety of commercially available solar tracking control schemes that implement solar tracking for such an ideal solar farm. Therefore, the ideal solar tracking control scheme can provide for solar tracking control of a hypothetically ideal solar farm that is built on non-complex terrain. As described herein, the solar tracking tool 308 is configured to implement the aggregate time-based output power data AP to generate power adjustment factors. The power adjustment factors can thus be applied to the ideal solar tracking control scheme to generate an adjusted solar tracking control scheme.

As an example, the ideal solar tracking control scheme can be expressed as a function of a set of solar tracking parameters corresponding to different physical layouts of an ideal solar field. As an example described hereinafter, the ideal solar tracking control scheme can be expressed as a function of a set of ground coverage ratio (GCR) parameters that each correspond to a physical GCR layout of an ideal solar field. Thus, each GCR parameter defines the solar tracking for a given corresponding physical GCR layout of the hypothetical ideal solar field, and thus of a specific solar tracking algorithm that defines limits of angular tilt of the solar panels. Particularly, a given solar farm with less spacing between rows of solar panels has a higher GCR layout, and can thus have a more limited range of tracking tilt without casting shadows. Conversely, a given solar farm with more spacing between rows of solar panels has a lower GCR layout, and can thus have a larger range of tracking tilt without casting shadows. Therefore, the ideal solar tracking control scheme can include a table of a set of GCR parameters that each have a total output power value for a respective set of hypothetical solar fields that are constructed as having such corresponding respective GCR layouts.

Therefore, as described herein, the term "GCR layout" refers to an actual physical arrangement of the solar panels in a solar field (e.g., an ideal solar field) that describes a relative proximity of the solar panels with respect to each other. The GCR layout can be expressed as a percentage of coverage of a given topographical area by solar panels (e.g., in a flat arrangement, such as parallel to a hypothetically perfect flat ground surface). The term "GCR parameter" can thus correspond a solar tracking operational algorithm that defines the range of solar tracking angles for the solar panels that are arranged at the respective GCR layout. Therefore, selecting a GCR parameter that corresponds to a respective corresponding GCR layout provides that the solar panels will implement solar tracking in the range of the solar tracking angles that provides for mitigating shadows on neighboring solar panels based on the proximity of the solar panels in one row with respect to a next row.

As described above, each of the GCR parameters in the ideal solar tracking control scheme can include a total output power value for a hypothetical solar field built at that respective GCR layout that defines a corresponding range of angular tilt. The solar tracking tool 308 can thus be configured to generate correction factors for each of the GCR parameters of the ideal solar tracking control scheme. For example, based on the calculated total output power of each of the rows of the solar field 202, as calculated by the row aggregator 508, the solar tracking tool 308 can be configured to calculate a total amount of output power provided by the solar field 202 if it was operating in the defined range of angular tilt stipulated by the respective one of the GCR layouts.

As an example, the correction factors can be expressed as a power difference relative to the total output power of the corresponding GCR parameter in the ideal solar tracking control scheme. Therefore, the ideal solar tracking control scheme can be modified by applying the correction factors to the output power of each GCR parameter to provide a net total output power of the solar field 202 operating at the range of angular tilt of the respective GCR layout. Alternatively, the solar tracking tool 308 can be configured to generate a solar tracking control scheme based on calculating a total output power for each range of angular tilt defined by each respective GCR layout. For example, the solar tracking tool 308 can implement the time-basis model for output power of a given row of solar panels over the course of a day, as defined in the aggregate time-based output power data AP, to identify the total output power for a given GCR parameter based on the total output power provided by the row of solar panels based on the range of angular tilt of the solar panels defined by the respective GCR layout.

As another example, the aggregate time-based output power data AP can also be provided as a function of different times of day (e.g., morning and evening) for each of the GCR parameters. In the example of FIG. 3, the solar tracking tool 308 is configured to receive time parameters, demonstrated as a signal TP, that defines a predetermined segmentation of times of a given day. For example, the time parameters TP can correspond to predefined windows of the day associated with morning and evening (e.g., including rules that define the boundaries of morning and evening, which can be variable over the course of the year). As another example, the time parameters TP can be broken up into finer portions (e.g., hourly) of the day. Therefore, the adjusted solar tracking control scheme for the solar field 202 can include different portions of times of the day for each of the GCR parameters. Therefore, for a morning and evening segmentation of a day, a given GCR parameter can include the amount of power output of the solar field 202 between a first extreme tilt and a specific tilt angle that defines a morning output power and between the specific tilt angle and a second extreme tilt opposite the first to define an evening output power for a given GCR parameter.

The solar tracking control scheme (e.g., the adjusted solar tracking control scheme) can thus include a set of GCR parameters that each define a solar tracking algorithm between a first extreme angular tilt and a second extreme angular tilt, with each of the GCR parameters including a total output power of the solar field 202, or a given block of solar panels of the solar field 202, operating at that solar tracking algorithm of the associated GCR layout. Therefore, the solar tracking tool 308 can be configured to facilitate selection of a given one of the GCR parameters of the solar tracking control scheme, such as having the highest output power for the solar field 202, as the manner of implementing the solar tracking of the solar field 202 or block of the solar field 202. The selection can be automated, such as by the solar tracking tool 308, or can be manual, such as by a user of the solar tracking tool 308. As an example, the solar tracking tool 308 can be operated a single time to generate the solar tracking control scheme from which the optimal GCR parameter(s) can be selected for a given solar field to facilitate optimal solar tracking throughout the year.

As described above, each of the GCR parameters can include multiple portions of a given day that can include a separate output power for the solar field 202 at the respective times. Therefore, the solar tracking tool 308 can facilitate selection of a given one of the GCR parameters for operation of the solar tracking during one segmentation of a given day, then select a different GCR parameter for a different portion of the given day based on a difference in the output power for each of the different GCR parameters at a respective segmentation of the given day. In this manner, the solar tracking tool 308 can dynamically select different GCR parameters of the adjusted solar tracking control scheme for operation of the solar tracking at different times of the day to optimize output power of the solar field 202.

In the example of FIG. 3, the solar tracking control scheme (e.g., the adjusted solar tracking control scheme) is provided to a panel tracking controller 310, demonstrated by a signal CTRL provided from the solar tracking tool 308 to the panel tracking controller 310. As an example, the panel tracking controller 310 can be located at the solar field 202, such that the signal CTRL that provides the solar tracking control scheme can be provided via a network, via a plug-in memory device (e.g., memory stick), or can correspond to manual entry of GCR parameters. The panel tracking controller 310 is thus configured to implement solar tracking of the solar panels of the solar field 202 based on the solar tracking control scheme generated by the solar tracking tool 308. The panel tracking controller 310 can include the motor/servo controllers that implement the solar tracking based on the solar tracking control scheme. For example, the panel tracking controller 310 can implement the solar tracking control scheme based on the selected GCR parameters at the one or more different portions of the day.

While the description herein regards a solar tracking control scheme that implements adjustment to and selection of GCR parameters, other solar tracking parameters can instead be implemented by the solar tracking tool 308. As an example, the solar tracking tool 308 can generate the solar tracking control scheme based on slope parameters of the solar panels. The slope parameters can describe a cross-axis (East-West) ground slope angle (in degrees) between two rows of solar panels. As an example, the solar tracking control scheme can provide a set of slope parameter values that each correspond to solar tracking controls that rotate the tracking plane of the solar panels, similar to the GCR parameters. Thus, the solar tracking tool 308 can provide correction factors to the slope parameters in a similar manner to as described above regarding GCR parameters, to generate an adjusted solar tracking control scheme. Therefore, the solar tracking tool 308 is not limited to generating the solar tracking control scheme as a function of GCR parameters, but can instead implement different types of solar tracking control parameters, such as slope parameters, instead.

Figure 6:
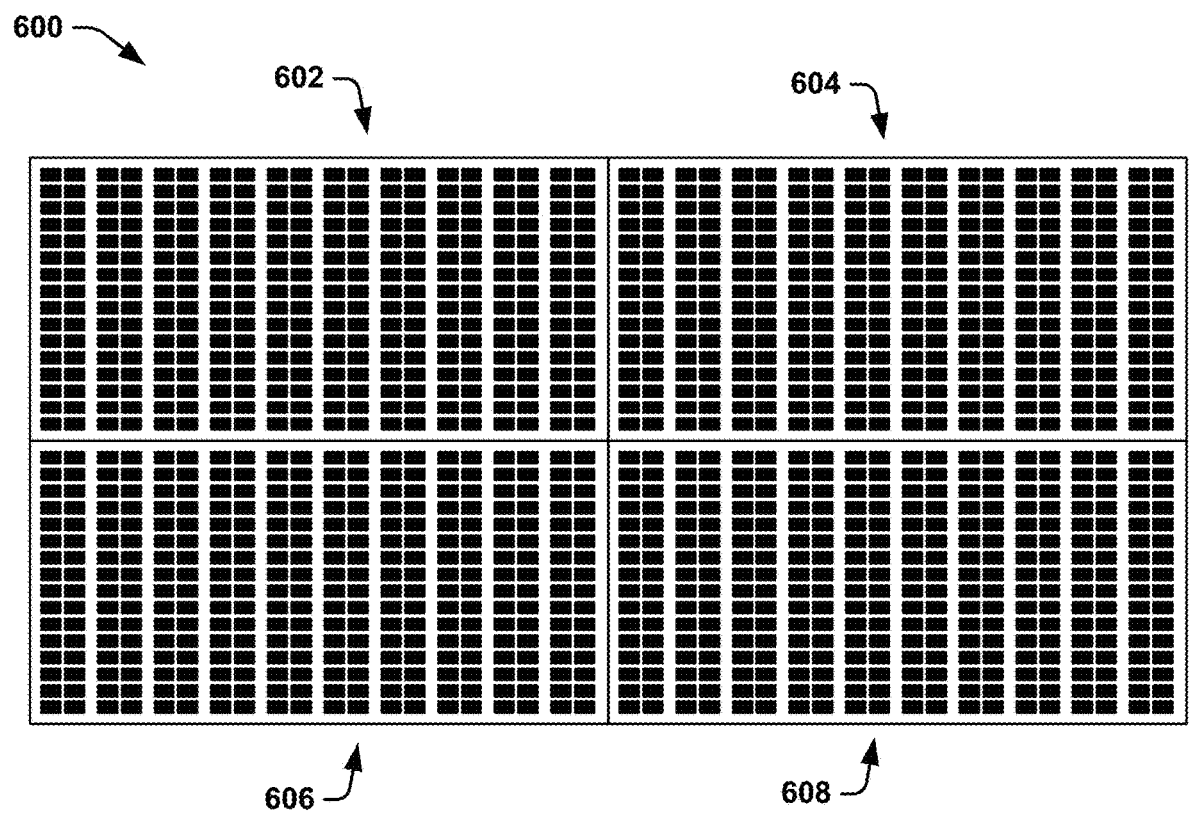
FIG. 6 illustrates an example diagram of a solar tracking control scheme.
Figure 7:
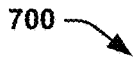
FIG. 7 illustrates an example of a solar field.

FIG. 6 illustrates an example of a solar field 600 that can be associated with the solar tracking control scheme 700. The solar field 600 can correspond to the solar field 202 in the example of FIG. 2, and can thus be built upon complex terrain. FIG. 7 illustrates an example diagram of a solar tracking control scheme 700. The solar tracking control scheme 700 can correspond to an adjusted solar tracking control scheme generated by the solar tracking tool 308 that is implemented by the panel tracking controller 310 for solar tracking operation of a solar field 600. Therefore, reference is to be made to the examples of FIGS. 2-5 in the following description of the examples of FIGS. 6 and 7.

The solar field 600 includes four blocks of solar panels. In the example of FIG. 6, the blocks are demonstrated as a first block 602, a second block 604, a third block 606, and a fourth block 608. The blocks 602, 604, 606, and 608 of solar panels can each correspond to separate independently controlled sets of solar panels of the solar field 600. Each of the blocks 602, 604, 606, and 608 of solar panels can be implement a different solar tracking scheme relative to each other, as described in greater detail herein, such as based on different sets of physical location parameters relative to each other. For example, some or all of the blocks 602, 604, 606, and 608 of solar panels can be built upon terrain that is variable in complexity, with different elevation changes of one of the blocks 602, 604, 606, and 608 of solar panels relative to one or more of the others. Accordingly, the solar tracking of the blocks 602, 604, 606, and 608 of solar panels can be controlled separately and differently with respect to each other.

The solar tracking control scheme 700 includes power outputs for each of different GCR parameters spanning from 30.0% to 38.0% for each of the four blocks 602, 604, 606, and 608 of solar panels (demonstrated as "BLOCK 1", "BLOCK 2", "BLOCK 3", and "BLOCK 4", respectively). The solar tracking control scheme 700 includes two portions of the day for each of the four blocks 602, 604, 606, and 608 of solar panels, demonstrated as "EVENING" and "MORNING" that can have defined start and stop times. Thus, for each of the GCR parameters, the solar tracking control scheme 700 includes a total output power for each of morning and evening for each of the four blocks 602, 604, 606, and 608 of solar panels of the solar field 600. The solar tracking control scheme 700 is demonstrated by example, and could include more blocks of solar panels, more portions of the day (or no segmentation of the day), and/or more GCR parameters than that demonstrated in the example of FIG. 7.

As an example, the solar tracking control scheme 700 can be generated by the solar tracking tool 308, as described above. For example, the solar tracking tool 308 can have implemented the aggregate time-based output power data AP to generate correction factors for each of the GCR parameters (e.g., 30.0% to 38.0%) of an ideal solar tracking control scheme based on the aggregate time-based output power data AP of the solar field 600 (e.g., based on the physical location parameters 304 associated with the solar field 600). For example, the solar tracking tool 308 can generate the aggregate time-based output power data AP for each of the four blocks 602, 604, 606, and 608 of solar panels separately based on separate sets of physical location parameters 304 for each of the respective blocks 602, 604, 606, and 608 of solar panels of the solar field 600. Therefore, the output power entries on the solar tracking control scheme 700 can correspond to a net sum of the correction factors and the output power entries of the ideal solar tracking control scheme for each of the blocks 602, 604, 606, and 608 of solar panels of the solar field 600.

As described previously, the solar tracking tool 308 can be configured to facilitate selection of the GCR parameter having the highest output power for implementing tracking control of the solar panels of a given solar field. Thus, the solar tracking tool 308 can determine which output power is the highest for each of the blocks 602, 604, 606, and 608 for each of the portions of the day. In the example of FIGS. 6 and 7, the solar tracking tool 308 can identify that, during the morning portion of the day, the first block 602 of solar panels has a highest output power when operating based on the solar tracking control dictated by a GCR parameter of 36.0%. Therefore, the GCR parameter of 36.0% can be selected for the first block 602 of solar panels to implement solar tracking of the first block 602 of solar panels between a first angular tilt and a second angular tilt defined by the 36.0% GCR layout of a solar field for the morning portion of the day. However, in the evening portion of the day, the solar tracking tool 308 then identifies that the first block 602 of solar panels has a highest output power when operating based on the solar tracking control dictated by a GCR parameter of 37.5%. Therefore, the GCR parameter of 37.5% can be selected for the first block 602 of solar panels to implement solar tracking of the first block 602 of solar panels between a first angular tilt and a second angular tilt defined by the 37.5% GCR layout of a solar field for the evening portion of the day.

Similarly, the solar tracking tool 308 can identify that, during the morning portion of the day, the second block 604 of solar panels has a highest output power when operating based on the solar tracking control dictated by a GCR parameter of 37.5%. Therefore, the GCR parameter of 37.5% can be selected for the second block 604 of solar panels to implement solar tracking of the second block 604 of solar panels between a first angular tilt and a second angular tilt defined by the 37.5% GCR layout of a solar field for the morning portion of the day. However, in the evening portion of the day, the solar tracking tool 308 then identifies that the second block 604 of solar panels has a highest output power when operating based on the solar tracking control dictated by a GCR parameter of 37.0%. Therefore, the GCR parameter of 37.0% can be selected for the second block 604 of solar panels to implement solar tracking of the second block 604 of solar panels between a first angular tilt and a second angular tilt defined by the 37.0% GCR layout of a solar field for the evening portion of the day.

Similarly, the solar tracking tool 308 can identify that, during the morning portion of the day, the third block 606 of solar panels has a highest output power when operating based on the solar tracking control dictated by a GCR parameter of 36.0%. Therefore, the GCR parameter of 36.0% can be selected for the third block 606 of solar panels to implement solar tracking of the third block 606 of solar panels between a first angular tilt and a second angular tilt defined by the 36.0% GCR layout of a solar field for the morning portion of the day. However, in the evening portion of the day, the solar tracking tool 308 then identifies that the third block 606 of solar panels has a highest output power when operating based on the solar tracking control dictated by a GCR parameter of 38.0%. Therefore, the GCR parameter of 38.0% can be selected for the third block 606 of solar panels to implement solar tracking of the third block 606 of solar panels between a first angular tilt and a second angular tilt defined by the 38.0% GCR layout of a solar field for the evening portion of the day.

Similarly, the solar tracking tool 308 can identify that, during the morning portion of the day, the fourth block 608 of solar panels has a highest output power when operating based on the solar tracking control dictated by a GCR parameter of 35.0%. Therefore, the GCR parameter of 35.0% can be selected for the fourth block 608 of solar panels to implement solar tracking of the fourth block 608 of solar panels between a first angular tilt and a second angular tilt defined by the 35.0% GCR layout of a solar field for the morning portion of the day. However, in the evening portion of the day, the solar tracking tool 308 then identifies that the fourth block 608 of solar panels has a highest output power when operating based on the solar tracking control dictated by a GCR parameter of 38.0%. Therefore, the GCR parameter of 38.0% can be selected for the fourth block 608 of solar panels to implement solar tracking of the fourth block 608 of solar panels between a first angular tilt and a second angular tilt defined by the 38.0% GCR layout of a solar field for the evening portion of the day.

As described herein, the solar tracking system 300 is configured to provide a simplistic manner of controlling solar tracking of panels in the solar field 600 that optimizes output power while mitigating shadows. Accordingly, the solar tracking system 300 accounts for shadowing of neighboring panels at extreme times of day of sun exposure (e.g., early morning and/or late evening) for the solar field 600 that is built on complex terrain (e.g., a hillside). As a result, solar energy capture by the solar field 600 on the complex terrain can be maximized while shadows on neighboring panels can be mitigated to provide for maximum power output of the solar field 600.

Figure 8:
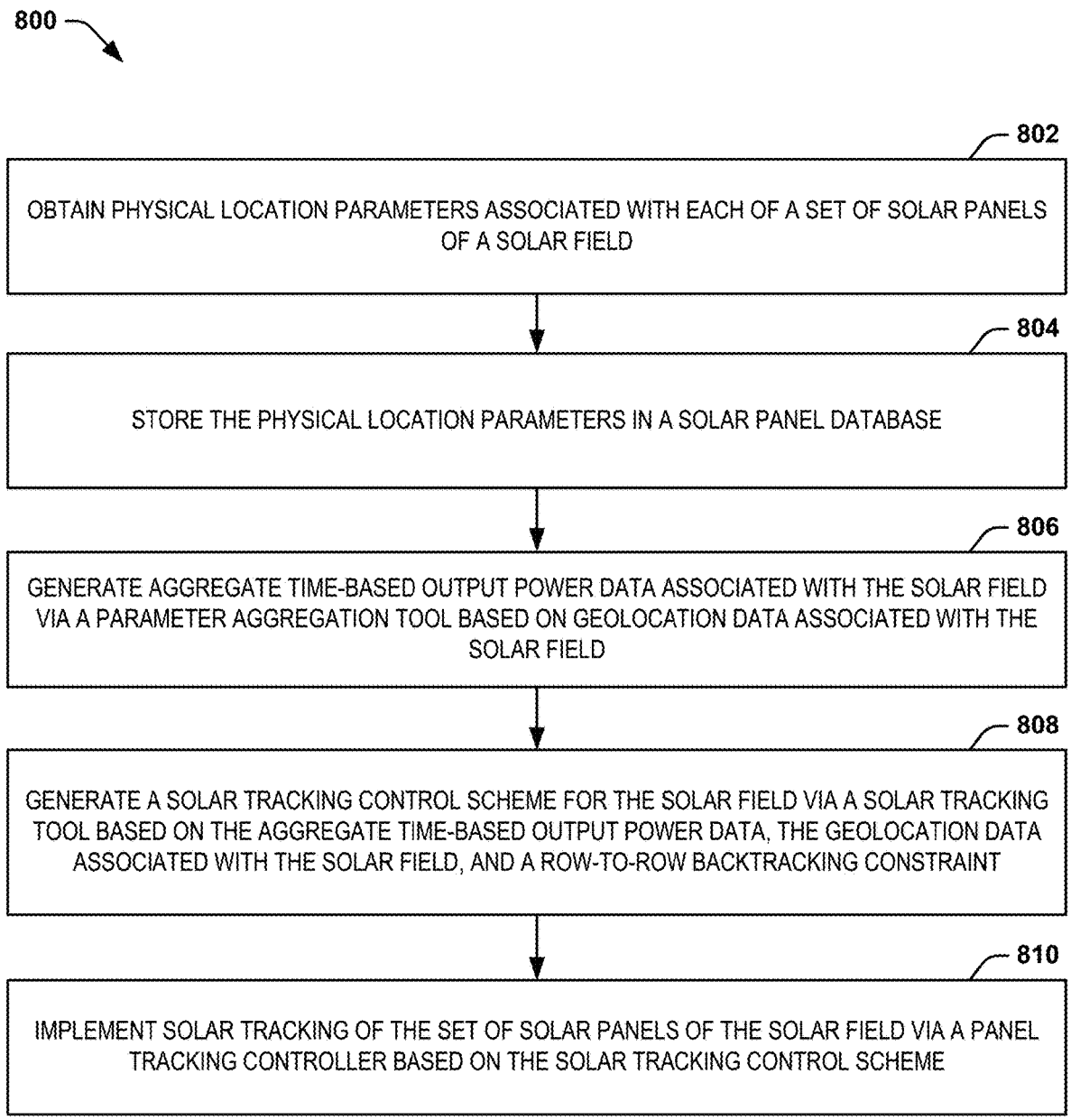
FIG. 8 illustrates an example of a method for implementing a solar tracking algorithm.

In view of the foregoing structural and functional features described above, methods in accordance with various aspects of the present disclosure will be better appreciated with reference to FIG. 8. While, for purposes of simplicity of explanation, the method of FIG. 8 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 8 illustrates a method 800 for implementing a solar tracking algorithm. At 802, physical location parameters (e.g., the physical location parameters 304) associated with each of a set of solar panels of a solar field (e.g., the solar field 202) are obtained. The physical location parameters can include a relative row-to-row height and spacing of the solar panels. At 804, the physical location parameters are stored in a solar panel database (e.g., the solar panel database 302). At 806, aggregate time-based output power data (e.g., the aggregate time-based output power data AP) associated with the solar field is generated via a parameter aggregation tool (e.g., the parameter aggregation tool 306) based on geolocation data (e.g., the geolocation data GD) associated with the solar field. At 808, a solar tracking control scheme (e.g., the solar tracking control scheme 700) is generated for the solar field via a solar tracking tool (e.g., the solar tracking tool 308) based on the aggregate time-based output power data, the geolocation data associated with the solar field, and a row-to-row backtracking constraint. At 810, solar tracking of the set of solar panels of the solar field is implemented via a panel tracking controller (e.g., the panel tracking controller 310) based on the solar tracking control scheme.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A solar tracking system comprising:
a solar panel database configured to store data associated with a solar field, the data associated with the solar field comprising physical location parameters associated with each of a set of solar panels of the solar field, the physical location parameters comprising a relative row-to-row height and spacing of the solar panels;
a parameter aggregation tool configured to aggregate the physical location parameters to generate aggregate time-based output power data associated with the solar field based on geolocation data associated with the solar field; and
a solar tracking tool configured to generate a solar tracking control scheme for the solar field based on the aggregate time-based output power data, the geolocation data associated with the solar field, and a row-to-row backtracking constraint that defines an acceptable amount of shadow being cast on a neighboring solar panel in the set of solar panels, such that the set of solar panels of the solar field can implement solar tracking based on the solar tracking scheme.

2. The system of claim 1, wherein the solar tracking tool comprises an ideal solar tracking control scheme for a default set of physical location parameters corresponding to equal row-to-row height and spacing of the solar panels, wherein the solar tracking tool is configured to adjust the ideal solar tracking control scheme based on the aggregate time-based output power data to generate an adjusted solar tracking control scheme.

3. The system of claim 1, wherein the solar tracking control scheme comprises a table of output power as a function of a plurality of solar tracking parameters, wherein the solar tracking tool is configured to facilitate selection of one of the solar tracking parameters having a highest output power to implement the solar tracking of the set of solar panels.

4. The system of claim 3, wherein the table of output power is provided as the function of the plurality of solar tracking parameters at each of different times of a day based on the geolocation data, wherein the panel tracking controller is configured to select one of the solar tracking parameters having a highest output power at each of different time portions of the day to implement the solar tracking of the set of solar panels.

5. The system of claim 1, wherein the physical location parameters comprise:
a relative height of each of the solar panels relative to a corresponding solar panel in a next row;
a distance of each of the solar panels relative to the corresponding solar panel in the next row;
terrain elevation data across the solar field; and
solar panel dimensions.

6. The system of claim 1, wherein the parameter aggregation tool is configured to:
calculate a row-to-row physical spacing between each solar panel relative to a corresponding solar panel in a next row based on the physical location parameters;
calculate a time-based row-to-row shading based on the row-to-row physical spacing and the geolocation data;
calculate a row-based energy and revenue output based on the time-based row-to-row shading and the geolocation data; and
aggregate the row-based energy and revenue output for the solar field to generate aggregate time-based output power data.

7. The system of claim 6, wherein the solar tracking tool comprises an ideal solar tracking control scheme for a default set of physical location parameters corresponding to equal row-to-row height and spacing of the solar panels, the ideal solar tracking control scheme comprising a table of output power as a function of a plurality of solar tracking parameters, wherein the parameter aggregation tool is further configured to adjust an output power for each of the solar tracking parameters of the ideal solar tracking control scheme based on the aggregate time-based output power data to generate an adjusted solar tracking control scheme.

8. The system of claim 1, wherein the solar field comprises a plurality of blocks of the solar field, wherein the parameter aggregation tool configured to aggregate the physical location parameters to generate the aggregate time-based output power data associated with each block of the solar field, wherein the solar tracking tool is configured to generate the solar tracking control scheme for each block of the solar field, such that solar tracking is implemented by the set of solar panels of each block of the solar field.

9. The system of claim 1, wherein the solar tracking control scheme comprises a plurality of solar tracking parameters at each of different times of a day based on the geolocation data, wherein the solar tracking tool is configured to facilitate selection of one of the solar tracking parameters having a highest output power at each of different time portions of the day to implement the solar tracking of the set of solar panels.

10. A method for implementing a solar tracking algorithm, the method comprising:
- obtaining physical location parameters associated with each of a set of solar panels of a solar field, the physical location parameters comprising a relative row-to-row height and spacing of the solar panels;
- storing the physical location parameters in a solar panel database;
- generating aggregate time-based output power data associated with the solar field via a parameter aggregation tool based on geolocation data associated with the solar field;
- generating a solar tracking control scheme for the solar field via a solar tracking tool based on the aggregate time-based output power data, the geolocation data associated with the solar field, and a row-to-row backtracking constraint that defines an acceptable mount of shadow being cast on a neighboring solar panel in the set of solar panels; and
- implementing solar tracking of the set of solar panels of the solar field via a panel tracking controller based on the solar tracking control scheme.

11. The method of claim 10, wherein obtaining the physical location parameters comprises obtaining the physical location parameters via overhead imaging provided from an unmanned aerial vehicle (UAV), the physical location parameters comprising a relative height of each of the solar panels relative to a corresponding solar panel in a next row and a distance of each of the solar panels relative to the corresponding solar panel in the next row.

12. The method of claim 10, further comprising:
- providing an ideal solar tracking control scheme for a default set of physical location parameters corresponding to equal row-to-row height and spacing of the solar panels via the solar tracking tool; and
- adjusting the ideal solar tracking control scheme based on the physical location parameters to generate an adjusted solar tracking control scheme.

13. The method of claim 10, wherein generating the solar tracking control scheme comprises generating a table of output power as a function of a plurality of solar tracking parameters at each of different times of a day based on the geolocation data, the method further comprising selecting one of the solar tracking parameters having a highest output power at each of different time portions of the day to implement the solar tracking of the set of solar panels.

14. The method of claim 10, further comprising providing an ideal solar tracking control scheme for a default set of physical location parameters corresponding to equal row-to-row height and spacing of the solar panels, the ideal solar tracking control scheme comprising a table of power output as a function of a plurality of solar tracking parameters, wherein generating the solar tracking control scheme comprises:
- calculating a row-to-row physical spacing between each solar panel relative to a corresponding solar panel in a next row based on the physical location parameters;
- calculating a time-based row-to-row shading based on the row-to-row physical spacing and the geolocation data;
- calculating a row-based energy and revenue output based on the time-based row-to-row shading and the geolocation data;
- aggregating the row-based energy and revenue output for the solar field to generate aggregate time-based output power data; and
- adjusting the power output for each of the solar tracking parameters of the ideal solar tracking control scheme based on the aggregate time-based output power data to generate an adjusted solar tracking control scheme.

15. A solar tracking system comprising:
- a solar panel database configured to store data associated with a solar field, the data associated with the solar field comprising physical location parameters associated with each of a set of solar panels of the solar field, the physical location parameters comprising a relative row-to-row height and spacing of the solar panels;
- a parameter aggregation tool configured to aggregate the physical location parameters to generate aggregate time-based output power data associated with the solar field based on geolocation data associated with the solar field; and
- a solar tracking tool comprising an ideal solar tracking control scheme for a default set of physical location parameters corresponding to equal row-to-row height and spacing of the solar panels, the solar tracking tool being configured to adjust the ideal solar tracking control scheme based on the aggregate time-based output power data, the geolocation data associated with the solar field, and a row-to-row backtracking constraint that defines an acceptable amount of shadow being cast on a neighboring solar panel in the set of solar panels to generate an adjusted solar tracking control scheme, such that the set of solar panels of the solar field can implement solar tracking based on the solar tracking scheme.

16. The system of claim 15, wherein the adjusted solar tracking control scheme comprises a table of output power as a function of a plurality of solar tracking parameters at each of different times of a day based on the geolocation data, wherein the solar tracking tool is configured to facilitate selection of one of the solar tracking parameters having a highest output power at each of different time portions of the day to implement the solar tracking of the set of solar panels.

17. The system of claim 16, wherein the ideal solar tracking control scheme comprises a table of power output as a function of the plurality of solar tracking parameters, wherein the parameter aggregation tool is configured to adjust the power output for each of the solar tracking parameters of the ideal solar tracking control scheme based on aggregate time-based output power data to generate the adjusted solar tracking control scheme.

18. The system of claim 15, wherein the parameter aggregation tool is configured to:
- calculate a row-to-row physical spacing between each solar panel relative to a corresponding solar panel in a next row based on the physical location parameters;
- calculate a time-based row-to-row shading based on the row-to-row physical spacing and the geolocation data;
- calculate a row-based energy and revenue output based on the time-based row-to-row shading and the geolocation data; and
- aggregate the row-based energy and revenue output for the solar field to generate aggregate time-based output power data.

19. The system of claim 15, wherein the solar tracking control scheme comprises a plurality of solar tracking parameters at each of different times of a day based on the geolocation data, wherein the solar tracking tool is configured to facilitate selection of one of the solar tracking parameters having a highest output power at each of different time portions of the day to implement the solar tracking of the set of solar panels.

20. The system of claim 1, wherein the acceptable amount of shadow being cast on the neighboring solar panel in the set of solar panels is defined as a percentage of the surface area of the neighboring solar panel.

\* \* \* \* \*